(12) United States Patent
Annoni et al.

(10) Patent No.: US 11,904,437 B2
(45) Date of Patent: Feb. 20, 2024

(54) ABRASIVE WATER-JET CUTTING MACHINE

(71) Applicants: POLITECNICO DI MILANO, Milan (IT); WATAJET S.r.l., Varese (IT)

(72) Inventors: Massimiliano Annoni, Milan (IT); Francesco Vigano, Monza e Brianza (IT)

(73) Assignees: POLITECNICO DI MILANO, Milan (IT); WATAJET S.R.L., Varese (IT)

( * ) Notice: Subject to any disclaimer, the term of this patent is extended or adjusted under 35 U.S.C. 154(b) by 1174 days.

(21) Appl. No.: 16/593,549

(22) Filed: Oct. 4, 2019

(65) Prior Publication Data

US 2020/0108483 A1 Apr. 9, 2020

(30) Foreign Application Priority Data

Oct. 4, 2018 (IT) .................. 102018000009170

(51) Int. Cl.
  *B24C 5/04* (2006.01)
  *B24C 1/04* (2006.01)
  *C09K 3/14* (2006.01)

(52) U.S. Cl.
  CPC ............... *B24C 5/04* (2013.01); *B24C 1/045* (2013.01); *C09K 3/1463* (2013.01)

(58) Field of Classification Search
  CPC .. B24C 5/04; B24C 1/04; B24C 1/045; B24C 7/0007; B24C 7/0015; B24C 7/0023; B24C 7/0038; B24C 7/0084
  See application file for complete search history.

(56) References Cited

U.S. PATENT DOCUMENTS

| 2,816,824 A | 12/1957 | Wilansky |
| 4,478,368 A | 10/1984 | Yie |

(Continued)

FOREIGN PATENT DOCUMENTS

| DE | 3516103 A1 | 11/1986 |
| GB | 296195 | 8/1928 |

(Continued)

*Primary Examiner* — Joel D Crandall
(74) *Attorney, Agent, or Firm* — CANTOR COLBURN LLP

(57) ABSTRACT

An abrasive water jet cutting machine including pumping means, which can be fluidically connected to a water source, for the generation of a pressurized water flow; a cutting head, forming a mixing chamber and a focusing nozzle; a dispensing system of powdered abrasive material, including a tank containing powdered abrasive material, a feeding pipe, fluidically connecting the tank to the mixing chamber of the cutting head, a dispenser, which dispenses the powdered abrasive material contained in the tank into the mixing chamber by means of the feeding pipe; wherein the pressurized water flow originating from the pumping means is conveyed into the mixing chamber of the cutting head where the pressure energy of the pressurized water flow is converted into kinetic energy so as to form a water jet; wherein the cutting head mixes, in the mixing chamber, the abrasive material with the water jet forming a water-abrasive material mixture jet, and the cutting head dispenses the water-abrasive material mixture jet by means of the focusing nozzle; wherein the powdered abrasive material contained in the tank is homogeneously dispersed in suspension in a gelatinous water-based fluid; and wherein the mass ratio of the dispersed powdered abrasive material to the gelatinous water-based fluid is from 1.0 to 3.5.

10 Claims, 7 Drawing Sheets

(56) References Cited

U.S. PATENT DOCUMENTS

| | | | |
|---|---|---|---|
| 4,955,164 A | | 9/1990 | Hashish |
| 5,178,469 A | | 1/1993 | Trieb |
| 5,527,204 A | * | 6/1996 | Rhoades ................. B24C 11/00 |
| | | | 451/39 |
| 5,964,644 A | * | 10/1999 | Rhoades ................. B24C 11/00 |
| | | | 451/39 |
| 2004/0097171 A1 | | 5/2004 | Liwszyc |
| 2011/0005142 A1 | * | 1/2011 | Mase ................... C09K 3/1409 |
| | | | 51/298 |

FOREIGN PATENT DOCUMENTS

| | | | |
|---|---|---|---|
| KR | 20090051694 A | * | 5/2009 |
| PL | 385519 A1 | | 1/2010 |
| WO | 2009131556 A1 | | 10/2009 |
| WO | 2012162446 A1 | | 11/2012 |
| WO | 2018060920 A1 | | 4/2018 |

\* cited by examiner

ABRASIVE WATER-JET CUTTING MACHINE

CROSS REFERENCE TO RELATED APPLICATION

This application is related to and claims the benefit of Italian Patent Application Number 102018000009170 filed on Oct. 4, 2018, the entire contents of which are incorporated herein by reference.

TECHNICAL FIELD

The present invention relates to an abrasive water-jet cutting machine.

BACKGROUND ART

Abrasive water-jet cutting machines are machine tools which cut and shape workpieces by means of a jet of a water-abrasive material mixture. Such a technology is known as "Abrasive Water Jet" (AWJ).

Abrasive water-jet cutting machines generally comprise:
pumping means, which can be fluidically connected to a water source, for the generation of a pressurized water flow;
a cutting head, comprising a primary nozzle, a mixing chamber and a focusing nozzle,
wherein the pressurized water flow originating from the pumping means is conveyed into the primary nozzle of the cutting head in which the pressure energy of the pressurized water flow is converted into kinetic energy so as to form a water jet, and wherein said water jet is then conveyed into the mixing chamber;
a gravity dispensing system of powdered abrasive material, comprising
a tank (e.g. a hopper) containing powdered abrasive material,
a feeding pipe, fluidically connecting the tank to the mixing chamber of the cutting head,
wherein the abrasive powder material gravity dispensing system dispenses said abrasive powder material into the mixing chamber of the cutting head via the feeding pipe; wherein the cutting head mixes, in the mixing chamber, the powdered abrasive material with the water jet forming a water-abrasive material mixture jet, and said cutting head dispenses the water-abrasive material mixture jet by means of the focusing nozzle.

The gravity dispensing systems of powdered abrasive material have several critical issues. In particular, such systems are excessively inconvenient when they are used to perform finer and more precise cutting operations, i.e. for so-called micro-abrasive water jet (μAWJ) cutting operations.

Specifically, μAWJ operations require the use of low-abrasive mass flow rates (less than 20 g/min) and the use of powdered abrasive material with a finer grain size (mesh greater than #200) as compared to the usual one for macro applications (which instead use meshes in the range from #80 to #120).

Gravity dispensing systems cannot guarantee a smooth and reliable supply of abrasive material for μAWJ operations. Indeed, gravity dispensing systems have a variability in the dispensing of abrasive material mass flow rate which reaches values around 10%, which is not acceptable for μAWJ operations.

Furthermore, abrasive water jet cutting machines are often actuated by means of actuating systems, such as beam, gantry, six-axis robotic arm, and such actuating systems, when characterized by fast dynamics, generate further critical issues in the constant supply of powdered abrasive material. Furthermore, gravity dispensing systems for powered abrasive material are incompatible with the use of the machine tool in "overhead" configuration (implemented, for example, by six-axis robots).

A further critical issue of these dispensing systems derives in that the powdered abrasive material dispensed by the dispensing system, which is particularly hygroscopic, is negatively exposed to the presence of environmental and process humidity present within the pipes into which the powdered abrasive material is conveyed.

In particular, at the interface between the feeding pipe and the mixing chamber of the cutting head, the hygroscopicity of the powered abrasive material causes the agglomeration of a stationary layer of powdered abrasive material on the inner wall of the feeding pipe, which progressively reduces the useful section for dispensing the abrasive material into the mixing chamber, whereby causing undesired changes in the abrasive material mass flow rate.

Furthermore, the layer of powdered abrasive material agglomerated on the inner wall of the feeding pipe is subject to the risk of sudden detachments, which contribute to produce undesirable variations in the abrasive material mass flow rate, and which, in the most serious cases, can cause clogging of the focusing nozzle of the cutting head and damage to the machine tool.

An attempt was made to overcome these problems through the use of abrasive material dispensing systems according to the "Abrasive Suspension Jet" (ASJ) technology, in which the abrasive powder material is previously dispersed in a dispersion liquid (e.g. water), so as to form a hydro-abrasive mixture stored in a tank. Such a hydro-abrasive mixture is then dispensed through a single nozzle to form a pressurized jet of hydro-abrasive mixture.

However, such an abrasive dispensing system can only be used at low pressures (less than 100 MPa), which are not high enough to perform the precision cutting required in μAWJ applications.

Furthermore, in order to ensure adequate dispersion of the powdered abrasive material in the dispersion substance, avoiding unwanted sedimentation, the mass ratio between the powdered abrasive material and the dispersion liquid of the aforesaid hydro-abrasive mixtures must be very low. This determines an exaggerated use of dispersion liquid in order to adequately disperse (and dispense) a low quantity of abrasive material in powder form.

BRIEF SUMMARY

The disclosure provides an abrasive water-jet cutting machine, and in particular for μAWJ machining, provided with an abrasive material dispensing system having such features as to solve at least some of the drawbacks of the prior art.

The disclosure provides such a dispensing system of powdered abrasive material as to ensure a regular and reliable dispensing of powdered abrasive material, even at low dosages of powdered abrasive material (less than 20 g/min).

The disclosure provides a dispensing system of powdered abrasive material compatible with the use of the machine tool in "overhead" configuration.

The disclosure provides a dispensing system of powdered abrasive material in which stationary agglomerations of powdered abrasive material are avoided, and other critical issues deriving from the exposure of the powdered abrasive material to both environmental and process humidity present within the pipes into which the powdered abrasive material is conveyed.

The disclosure provides a dispensing system of abrasive material which can also be used at the pressures required to perform processes of the μAWJ type (over 380 MPa).

The disclosure provides a dispensing system of powdered abrasive material which uses a smaller amount of dispersion substance to adequately dispense a larger amount of powdered abrasive material.

The disclosure relates to an abrasive water jet cutting machine provided with an abrasive material dispensing system according to claim 1. The dependent claims relate to advantageous and preferred embodiments.

A further disclosed aspect is a composition which comprises a powdered abrasive material dispersed in a gelatinous fluid, as well as the use of said material in abrasive water jet cutting methods.

According to an aspect of the invention, an abrasive water-jet cutting machine comprises:
  pumping means, which can be fluidically connected to a water source, for the generation of a pressurized water flow;
  a cutting head, comprising a primary nozzle, a mixing chamber and a focusing nozzle,
  wherein the pressurized water flow originating from the pumping means is conveyed into the primary nozzle of the cutting head in which the pressure energy of the pressurized water flow is converted into kinetic energy so as to form a water jet, and wherein said water jet is then conveyed into the mixing chamber;
  a dispensing system of powdered abrasive material, comprising:
    a tank containing powdered abrasive material,
    a feeding pipe, fluidically connecting the tank to the mixing chamber of the cutting head,
    a dispenser, dispensing the powdered abrasive material contained within the tank into the mixing chamber by means of the feeding pipe;
  wherein the cutting head mixes, in the mixing chamber, the abrasive material with the water jet forming a water-abrasive material mixture jet, and said cutting head dispenses the water-abrasive material mixture jet by means of the focusing nozzle.
  wherein the powdered abrasive material contained in the tank is homogeneously dispersed in suspension in a gelatinous water-based fluid;
  and wherein the mass ratio of the dispersed powdered abrasive material to the gelatinous water-based fluid is comprised between 1.0 and 3.5, or between 1.5 and 3.0, preferably between 2.0 and 2.5.

Such a configuration of the dispensing system, and in particular of the abrasive material dispensed thereby, allows the control of the hygroscopic properties of the abrasive material. Indeed, since the powdered abrasive material is homogeneously dispersed in the water-based gelatinous fluid, it is completely saturated with water, and therefore it is immune to the critical issues deriving from its exposure to environmental and process humidity.

Furthermore, since the powdered abrasive material is completely saturated with water and is homogeneously dispersed in the water-based gelatinous fluid, said dispensing system dispenses the abrasive material in a regular and reliable manner, even at small doses of abrasive material (less than 20 g/min).

Furthermore, such a dispensing system is compatible with the use of the cutting machine in "overhead" configuration.

Furthermore, since the dosage of abrasive powder material evenly dispersed in the water-based gelatinous fluid has a mass ratio of between 1.0 and 3.5, said dispensing system uses a smaller amount of dispersion substance to adequately dispense a larger amount of powdered abrasive material.

Last but not least, such a dispensing system can also be used at the pressures required to perform μAWJ operations (above 380 MPa).

BRIEF DESCRIPTION OF THE DRAWINGS

In order to understand the invention and better appreciate its advantages, the description of some non-limiting embodiments will be provided below with reference to the figures, in which.

DETAILED DESCRIPTION

Figure 1:
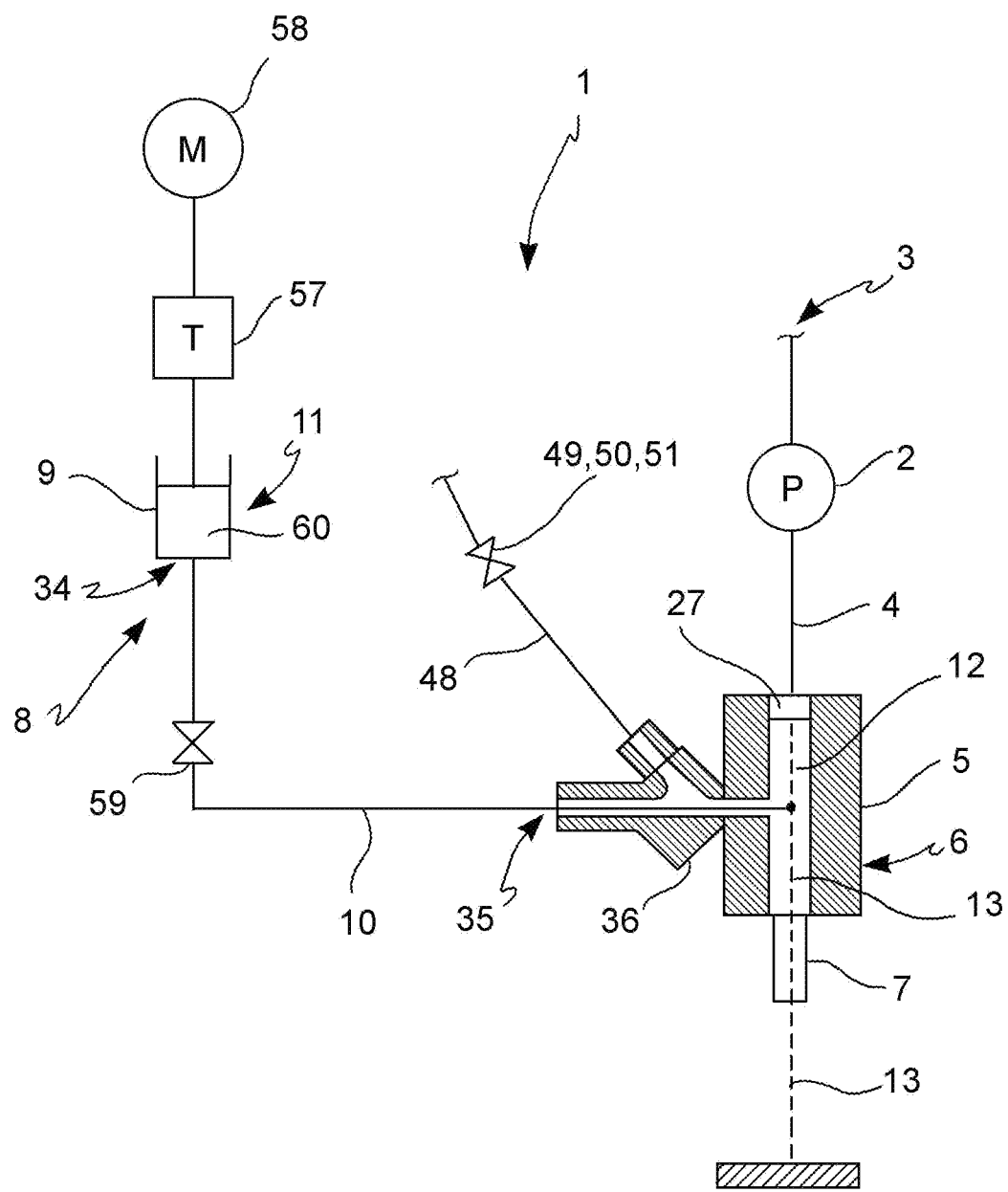
FIG. 1 schematically shows the abrasive water-jet cutting machine, according to an embodiment of the invention.
Figure 2A:
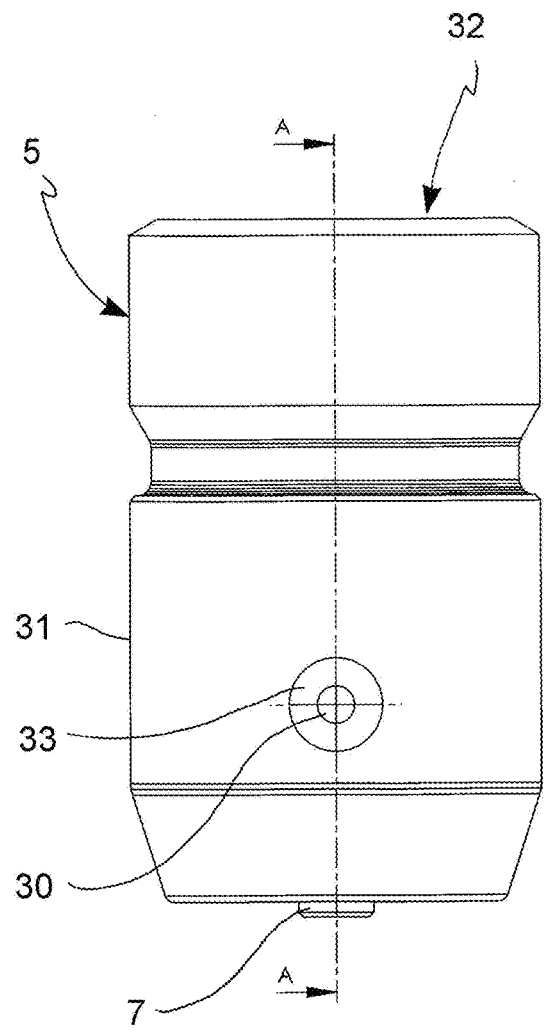
FIG. 2A is a front view of a cutting head according to an embodiment of the invention.
Figure 2B:
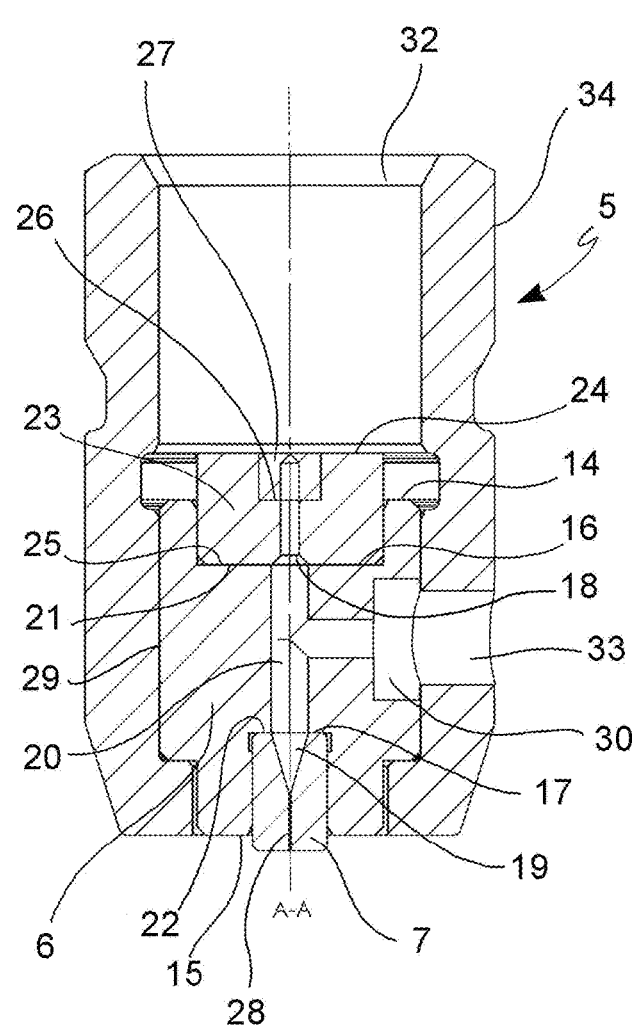
FIG. 2B is an axial section view of the cutting head shown in FIG. 2A.
Figure 3A:
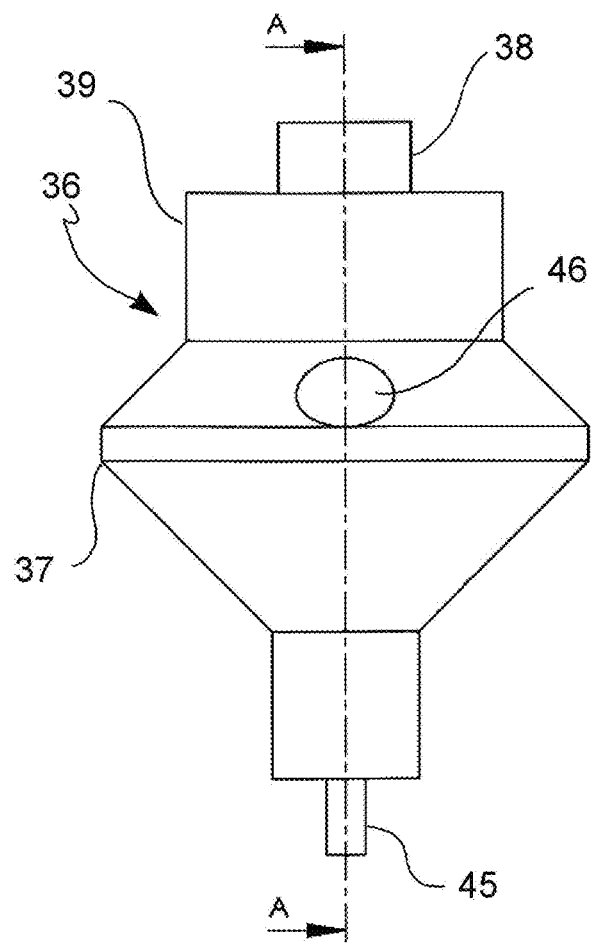
FIG. 3A is a front view of an injector member according to an embodiment of the invention.
Figure 3B:
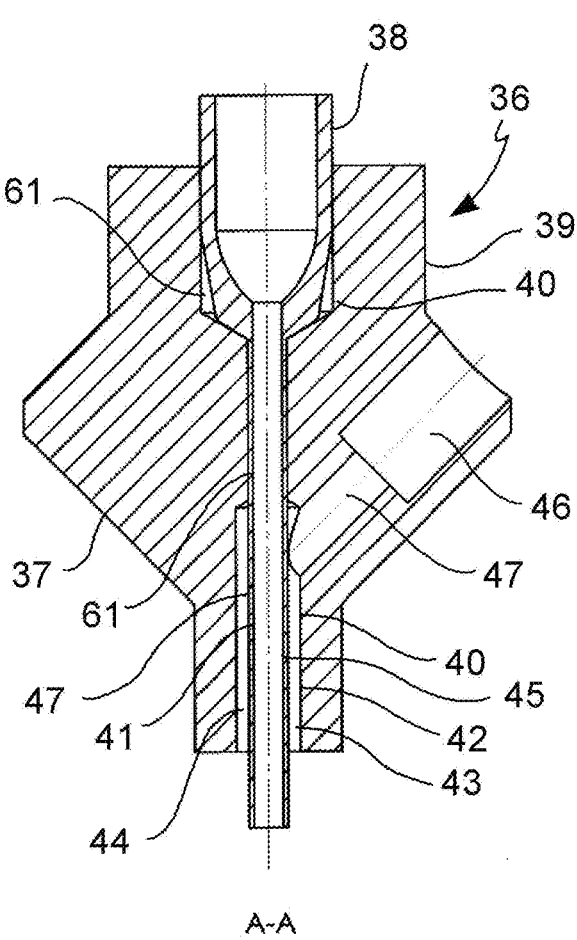
FIG. 3B is an axial section view of the injector member shown in FIG. 3A.
Figure 4:
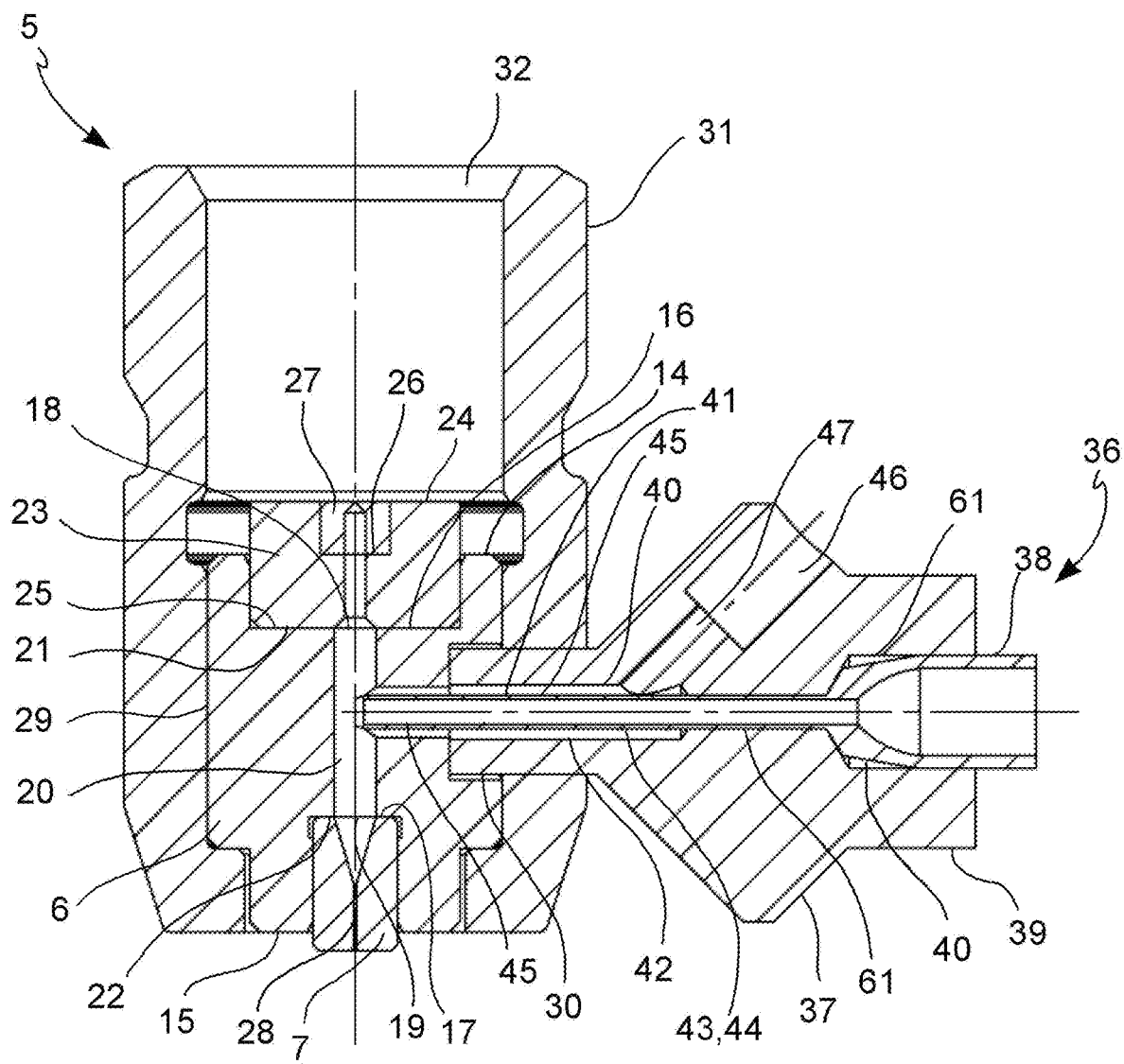
FIG. 4 is a longitudinal section view of the assembly cutting head-injector member assembly.
Figures 5A, 5B:
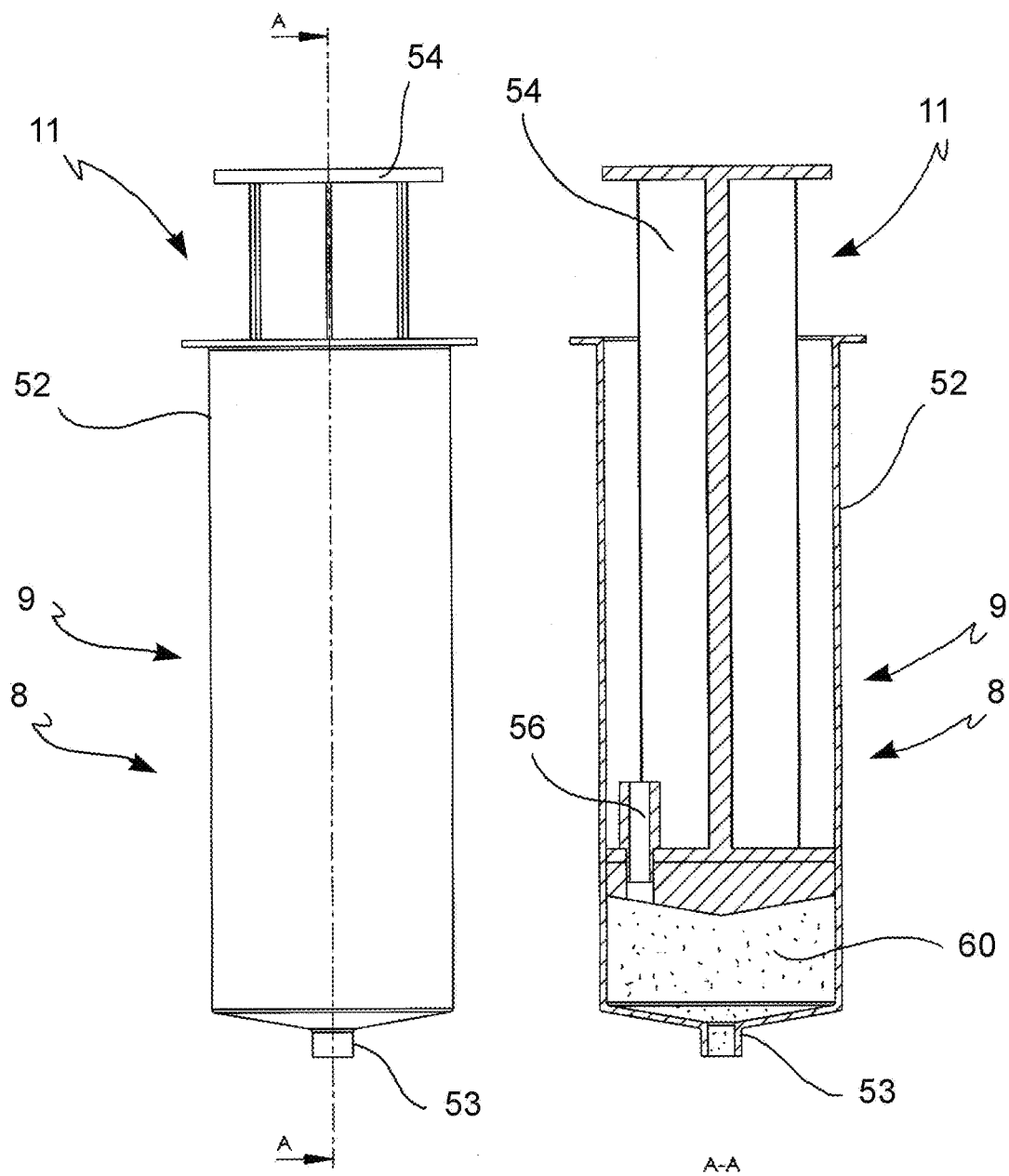
FIG. 5A is a front view of a dispensing system according to an embodiment of the invention.
FIG. 5B is an axial section view of the dispensing system shown in FIG. 5A.

With reference to the figures, an abrasive water-jet cutting machine according to the invention is indicated by reference numeral 1 as a whole.

According to an aspect of the invention, the abrasive water jet cutting machine 1 comprises pumping means 2, which can be fluidically connected to a water source 3, for the generation of a pressurized water flow 4.

The cutting machine 1 further comprises a cutting head 5, comprising a primary nozzle 27, a mixing chamber 6 and a focusing nozzle 7.

According to an aspect of the invention, the pressurized water flow 4 originating from the pumping means 2 is conveyed into the primary nozzle 27 of the cutting head 5 in which the pressure energy of the pressurized water flow 4 is converted into kinetic energy so as to form a water jet 12, and wherein said water jet 12 is then conveyed into the mixing chamber 6.

The cutting machine 1 further comprises a dispensing system 8 of powdered abrasive material, which comprises a tank 9 containing abrasive material, a feeding pipe 10, which fluidically connects the tank 9 to the mixing chamber 6 of the cutting head 5, a dispenser 11, which dispenses the powdered abrasive material contained within the tank 9 into the mixing chamber 6 by means of the feeding pipe 10.

According to a further aspect of the invention, the cutting head 5 mixes, in the mixing chamber 6, the abrasive material with the water jet 12 forming a water-abrasive material mixture jet 13, which is dispensed by the cutting head 5 by means of the focusing nozzle 7.

The focusing nozzle 7 also has the task, following the mixing of the abrasive material with the water jet 12, of increasing mixing efficiency and transferring of momentum from the water jet 12 to the abrasive material.

According to a further aspect of the invention, the powdered abrasive material contained in the tank 9 is homogeneously dispersed in suspension in a gelatinous water-based fluid 60.

According to a further aspect of the invention, the mass ratio of the dispersed powdered abrasive material to the gelatinous water-based fluid 60 is from 1.0 to 3.5.

Such a configuration of the dispensing system 8, and in particular of the abrasive material dispensed thereby, allows the control of the hygroscopic properties of the powdered abrasive material. Indeed, since the powdered abrasive material is homogeneously dispersed in the water-based gelatinous fluid 60, it is completely saturated with water, and therefore it is immune to the critical issues deriving from its exposure to environmental and process humidity.

Furthermore, since the powdered abrasive material is completely saturated with water and is homogeneously dispersed in the water-based gelatinous fluid 60, said dispensing system 8 dispenses the abrasive material in a regular and reliable manner, even at small doses of abrasive material (less than 20 g/min).

Furthermore, such a dispensing system 8 is compatible with the use of the cutting machine 1 in "overhead" configuration.

Furthermore, since the dosage of abrasive powder material evenly dispersed in the water-based gelatinous fluid 60 has a mass ratio of between 1.0 and 3.5, the dispensing system 8 uses a smaller amount of dispersion substance with respect to the abrasive material dispensing systems according to ASJ technology, to adequately dispense a larger amount of powdered abrasive material.

Last but not least, such a dispensing system 8 can also be used at the pressures required to perform μAWJ processes (above 380 MPa).

According to a further embodiment, the mass ratio of the dispersed powdered abrasive material to the gelatinous water-based fluid 60 in which the powdered abrasive material is uniformly dispersed is approximately 2.0.

According to an embodiment, the particle size of the powdered abrasive material homogeneously dispersed in suspension in the gelatinous water-based fluid 60 is less than #200 mesh, preferably is comprised between #350 mesh and #600 mesh.

The average size of granules of abrasive powder material is less than 70 micrometers, preferably between 15 and 60 micrometers.

The nature and chemical composition of the abrasive material used can be of different types, e.g. natural minerals, such as Almandine Garnet or Olivine, synthetic, ceramic, such as Silicon Carbide, metal compounds, biological material.

The water-based gelatinous fluid 60 consists of distilled water and a gelling agent (e.g. a polymer) in sufficient quantity to keep the mixture in suspension without the granules of powdered abrasive material settling on the bottom of tank 9.

According to an embodiment of the invention, the cutting head 5 comprises a substantially tubular mixing chamber 6, which forms a front surface 14, a rear surface 15 parallel to the front surface 14, and a peripheral surface 29.

The terms "front" and "rear" refer to the direction of the pressurized water flow 4 through the cutting head 5.

The mixing chamber 6 forms a front seat 16 at the front surface 14 and a rear seat 17 at the rear surface 15, wherein the front and rear seats 16, 17 are substantially cylindrical in shape.

Furthermore, the mixing chamber 6 forms a water inlet opening 18 at the front seat 16, and a mixture outlet opening 19 at the rear seat 17.

The mixing chamber 6 forms a jet channel 20, transverse to the front surface 14 and to the rear surface 15, and in flow communication with the front seat 16 and the rear seat 17 by means of the water inlet opening 18 and the mixture outlet opening 19.

The jet channel 20 and the front seat 16 form a front shoulder 21 at the water inlet opening 18. Furthermore, the jet channel 20 and the rear seat 17 form a rear shoulder 22 at the mixture inlet opening 19.

A primary nozzle housing 23 is accommodated inside the front housing 16, abutting against the front shoulder 21.

The primary nozzle housing 23 is substantially cylindrical in shape, and defines a front base 24 and a rear base 25, wherein the rear base 25 abuts against the front shoulder 21.

The primary nozzle housing 23 forms a primary nozzle seat 26 at the front base 24.

A primary nozzle 27 is accommodated in the primary nozzle housing 26. The primary nozzle 27 converts the pressurized water flow 4 from the pumping means 2 into the water jet 12.

The focusing nozzle 7 forms a focusing channel 28 to concentrate the water jet 12.

The focusing nozzle 7 is arranged in the rear seat 17 and locked by interference. Advantageously, such a locking interference ensures correct centering and positioning of the focusing nozzle 7 with respect to the primary nozzle 27.

The mixing chamber 6 forms an injection opening 30 at the peripheral surface 29, and the injection opening 30 is transverse to the jet channel 20 and connected fluidly to the jet channel 20.

The cutting head 5 further comprises a retaining flange 31, forming a cavity 32 which holds and seals inside the mixing chamber 6. Furthermore, the retaining flange 31 forms a second injection opening 33, which is configured concentrically with respect to the injection opening 30 of the mixing chamber 6.

The injection opening 30 and the second injection opening 33 allow the injection of the abrasive dispersed in the water-based gelatinous fluid 60 into the mixing chamber 6 by means of a connection with the feeding pipe 10.

According to an embodiment of the invention, the feeding pipe 10 is connected, at a first end 34 thereof, to the tank 9, and is connected, at a second end 35 thereof, to an injector member 36.

According to an embodiment of the invention, the injector member 36 comprises an injector housing 37 and an injector nozzle 38.

The injector housing 37 forms a connection portion 39 adapted to connect the injector member 36 to the feeding pipe 10.

In addition, the injector housing 37 forms a shaped channel 40 inside adapted to accommodate the injector nozzle 38.

The injector nozzle 38 forms an injection channel 41 therein, and an end portion 45 of the injector nozzle 38 is configured to protrude into the jet channel 20 of the mixing chamber 6, so that the injection channel 41 fluidically connects the feeding pipe 10 to the jet channel 20.

According to an embodiment of the invention, the end portion 45 of the injector nozzle 38 extends by a fraction of millimeters, preferably 0.5 mm, within the jet channel 20. Advantageously, this allows the abrasive material, dispersed in the water-based gelatinous fluid 60, to be conveyed in the immediate vicinity of the water jet 12. Therefore, the conveyed abrasive does not accumulate on the walls of the jet channel 20 and is not released suddenly.

The positioning and connection of the injector nozzle 38 to the mixing chamber 6 is ensured by means of a threaded joint, bayonet connection or other connection system which guarantees robustness and complete sealing.

According to an embodiment of the invention, the shaped channel 40 comprises an end portion 42, which forms an air injection channel 43 concentric to the end portion 42, and a coupling portion 61 adapted to achieve a shape coupling with the injector nozzle 38.

Advantageously, the concentric configuration of the air injection channel 43 compared to the end portion 42 reduces the overall dimensions of the injector member 36.

Further advantageously, the concentric configuration of the air injection channel 43 allows an optimal projection of the abrasive material dispersed in the water-based gelatinous fluid 60 towards the water jet 12, whereby keeping the air injection channel 43 clean and functioning.

The air injection channel 43 forms a gap 44, between the air injection channel 43 and the end portion 45 of the injector nozzle 38.

Furthermore, the injector housing 37 forms an airflow channel 47 which flows into the air injection channel 43, and which forms a connection housing 46.

The air flow channel 47 is connected to a pneumatic conduit 48 at the connection seat 46. Advantageously, the inner diameter of the pneumatic conduit 48 is substantially identical to the diameter of the airflow duct 47, so as to avoid steps that could negatively impact on the airflow.

On the pneumatic conduit 48 there is a valve 49 which regulates the air flow entering the air flow duct 47. The air flow entering the air flow channel 47 is sucked in by the passage of the water jet 12 by Venturi effect.

Furthermore, the pneumatic conduit 48 is provided with a pressure gauge 50 and a flow meter 51 (either analog or digital) to monitor and allow the control of the air flow introduced into the pneumatic conduit 48.

Advantageously, by means of the control valve 49 it is possible to reduce the flow of air entering the pneumatic conduit 48, so as to reduce the air dosage of the water jet 12. In such a manner, the Venturi effect generated by the water jet 12 can propagate to the abrasive material dispersed in the water-based gelatinous fluid 60, which is therefore sucked into the mixing chamber 6 without the intervention of a possible upstream thrust.

Such a configuration of the pneumatic conduit 48 can also be used for checking the assembly of the cutting head 5, for monitoring the state of wear of the components (e.g. the injector nozzle 38, the primary nozzle 27, the mixing chamber 6 and the focusing nozzle 7) and for checking the correct execution of the cut in real time.

In order to check assembly, it is necessary to completely prevent the access of air into the mixing chamber 6, so as to measure the level of pressure generated inside the mixing chamber 6 by the passage of the water jet 12. Pressure values higher than, equal to or close to atmospheric value indicate an incorrect alignment of the components, with probable contact between the water jet 12 and the channel and the inner walls of the jet channel 20 or the focusing nozzle 7. Values closer to vacuum (e.g. 0.2 or 0.1 absolute bar) indicate a valid alignment of the components, which generate a significant Venturi effect.

In order to check the state of wear of the components, it is necessary to record the pressure changes in the mixing chamber 6 over an extended period to determine the drift of wear of the components of the cutting head 5. In particular, a less pronounced Venturi effect in the jet channel 20 reveals the progressive wear of the primary nozzle, with a consequent decrease in the outflow velocity of the water jet 12.

In order to check the correct execution of the cut in real time, it is necessary to record the punctual pressure variations in the mixing chamber. Such events can be traced back to malfunctions in the water jet dispensing system 12 of the abrasive material dispersed in the water-based gelatinous fluid 60 or of the air injected through the air flow channel 47. By evaluating these phenomena, it is possible to determine the correct function of the water jet 12 at any time, so as to predict the success of the cutting operation and, if not, interrupt the cut.

According to an embodiment of the invention, the tank 9 is a vessel with a substantially cylindrical shape.

According to a preferred embodiment, the tank 9 is configured in the form of a syringe, and comprises a cylindrical portion 52, within which the abrasive material dispersed in the water-based gelatinous fluid 60 is loaded and stored, and a cannula portion 53.

According to an embodiment, the nozzle 11 is configured as a plunger organ 54, which is slidingly arranged within the cylindrical portion 52, and is configured so as to push the abrasive material dispersed in the water-based gelatinous fluid 60 contained in the cylindrical portion 52 of the tank 9 towards the cannula portion 53.

The cannula portion 53 is connected to the first end 34 of the feeding pipe 10 in order to make a fluidic connection between the tank 9 and the feeding pipe 10.

According to a preferred embodiment, the plunger member 54 is configured to apply a thrust pressure of about 1 relative bar.

Advantageously, using such a pressure value causes the abrasive material dispersed in the water-based gelatinous fluid 60 to be substantially incompressible, therefore the advancement rate of the plunger member is easily and directly correlated to the flow rate of abrasive material dispersed in the water-based gelatinous fluid 60.

According to an embodiment, the dispensing system 8 comprises an auxiliary filling syringe, adapted to recharge the tank 9 in real time, i.e. to fill the tank 9 with new abrasive material dispersed in the water-based gelatinous fluid 60 at the same time as the execution of a cutting process by the same cutting machine 1.

Preferably, such a real time filling is performed in a period of time between the machining of two successive geometries belonging to the same component under construction or to different components.

According to a further embodiment, the dispensing system 8 comprises an abrasive tank dedicated to the storage of abrasive material and a gel tank dedicated to the storage of water-based gelatinous fluid, in which the simultaneous mixing and pressurization of the abrasive material with the water-based gelatinous fluid takes place in the feeding pipe 10, through a "turbulent" path.

Advantageously, the tank 9 is filled at source by means of an auxiliary dispenser to avoid the presence of air bubbles or other gases.

Furthermore, a rear relief valve 56 is arranged on the plunger member 54 to evacuate possible air or other gas bubbles present in the gelatinous water-based fluid 60 inside which the abrasive material is dispersed, which may introduce compressibility or cause interruptions in the feeding of the abrasive material dispersed into the gelatinous water-based fluid 60 at the cutting head 5.

The plunger member 54 is connected to a motor 58, preferably electric, by means of a transmission 57.

According to a preferred embodiment, a flow stop valve 59 is connected to the feeding pipe 10. The flow stop valve 59 is designed to either stop or divert the flow of abrasive material dispersed in the water-based gelatinous fluid 60 in an emergency.

Advantageously, in such a manner it is possible to stop the injection of abrasive material dispersed in the water-based gelatinous fluid 60 into the cutting head 5, also if the dispensing system 8 continues to dispense abrasive material dispersed in the water-based gelatinous fluid 60 from tank 9.

With further advantage, the flow stop valve 59 has the auxiliary function of interrupting any upward flow from the cutting head 5, e.g. of air or water in the event of obstruction of the focusing nozzle 7, so as to protect the dispensing system 8 from overpressure damage.

According to a further aspect, the present invention relates to a composition comprising a powdered abrasive material homogeneously dispersed in suspension in a gelatinous water-based fluid 60, wherein the mass ratio of the dispersed powdered abrasive material to the gelatinous water-based fluid 60 is from 1.0 to 3.5, or approximately 2.0 and wherein the particle size of the powdered abrasive material dispersed in suspension in the gelatinous water-based fluid 60 is from #350 mesh to #600 mesh.

Preferably, the average size of granules of abrasive powder material in said composition is comprised between 15 and 60 micrometers.

A further object of the present invention relates to an abrasive water jet cutting method, wherein said method comprises the use of the abrasive composition according to the present invention.

Of course, a person skilled in the art can make further changes and variants all contained within the scope of protection defined by the claims in order to satisfy contingent, specific needs.

Hereinafter, some experimental tests carried out with the abrasive water jet cutting machine and the composition including the abrasive material disclosed herein will be described, aimed at highlighting effectiveness and technical advantages.

Example 1: Cutting Test on 2.0-Mm Thick Austenitic Stainless Steel (AISI 301/EN 1.4310)

The cutting test is performed on 2.0-mm thick austenitic stainless steel (AISI 301/EN 1.4310) to verify the performance of the disclosed cutting machine on relatively thick material.

Indeed, 2.0 mm is close to the maximum thickness which can be cut with μAWJ cutting machines of the background art known to inventors.

The kerf geometry and the cut wall surface roughness are measured at different depth levels:
at 0.2 mm from the top ("top")
at mid-height (1.0 mm, "mid")
at 0.2 mm from the bottom ("bot")

The test results are shown in tables 1.1 and 1.2 below.

TABLE 1.1

Cutting tests on 2-mm thick austenitic stainless steel (AISI 301/EN 1.4310) Macro-geometric verification of cutting wall as advancement rate varies.
Austenitic stainless steel (AISI 301/EN 1.4310), 2.0 mm thick
Kerf width inspection

| $v_f$ [mm/min] | $W_{top}$ [mm] | $W_{bot}$ [mm] | $W_{average}$ [mm] | Taper [mm] |
|---|---|---|---|---|
| 3 | 0.187 | 0.221 | 0.204 | −0.015 |
| 6 | 0.172 | 0.158 | 0.165 | 0.007 |
| 9 | 0.171 | 0.145 | 0.158 | 0.013 |
| 12 | 0.165 | 0.128 | 0.146 | 0.018 |
| 15 | 0.164 | 0.116 | 0.140 | 0.024 |
| 18 | 0.157 | 0.108 | 0.133 | 0.024 |
| 21 | 0.153 | 0.093 | 0.123 | 0.030 |
| 24 | 0.152 | 0.090 | 0.121 | 0.031 |

$v_f$: head advancement rate
$W_{top}$: upper kerf width
$W_{bot}$: lower kerf width
$W_{average}$: average kerf width
Taper: single wall taper

TABLE 1.2

Cutting tests on 2-mm thick austenitic stainless steel (AISI 301/EN 1.4310) Roughness verification of cutting wall as advancement rate varies.
Austenitic stainless steel (AISI 301/EN 1.4310), 2.0 mm thick
Roughness inspection

| $v_f$ [mm/min] | $R_a$ top [μm] | $R_a$ mid [μm] | $R_a$ bot [μm] | $R_a$ average [μm] | $R_z$ top [μm] | $R_z$ mid [μm] | $R_z$ bot [μm] | $R_z$ average [μm] |
|---|---|---|---|---|---|---|---|---|
| 3 | 0.36 | 0.44 | 0.56 | 0.45 | 3.02 | 3.15 | 4.00 | 3.38 |
| 6 | 0.38 | 0.49 | 0.64 | 0.51 | 3.28 | 3.95 | 5.01 | 4.01 |
| 9 | 0.42 | 0.48 | 0.64 | 0.51 | 3.61 | 3.70 | 4.77 | 3.92 |
| 12 | 0.44 | 0.59 | 0.81 | 0.67 | 3.77 | 4.34 | 5.90 | 5.05 |
| 15 | 0.47 | 0.66 | 0.96 | 0.72 | 3.98 | 5.16 | 6.47 | 5.25 |
| 18 | 0.49 | 0.83 | 1.27 | 0.90 | 3.90 | 6.69 | 8.15 | 6.57 |
| 21 | 0.50 | 0.94 | 1.53 | 1.04 | 3.98 | 6.33 | 9.20 | 6.79 |
| 24 | 0.64 | 1.29 | 2.32 | 1.52 | 5.05 | 9.27 | 14.73 | 9.91 |

$v_f$: head advancement rate
$R_a$ top: average arithmetic roughness near top surface of piece
$R_a$ mid: average arithmetic roughness at mid thickness of piece
$R_a$ bot: average arithmetic roughness near bottom surface of piece
$R_a$ average: average measured $R_a$ values
$R_z$ top: roughness on 10 extreme points near the top surface of piece
$R_z$ mid: roughness on 10 extreme points at mid thickness of piece
$R_z$ bot: roughness on 10 extreme points near the bottom surface of piece
$R_z$ average: average measured $R_z$ values Two operating conditions are revealed by the test:
a complete but irregular cut is achieved at high $v_f$=24 mm/min;
a high-quality cut is achieved at lower $v_f$, such as $v_f$=6 mm/min is an ideal value because it minimizes the wall taper, making it possible to use both sides of the cut given a tolerance of 1 hundredth of a millimeter, without having to introduce taper of the head to compensate for the defect.

Example 2: Complex Cutting Test

The new system proves to be effective in cutting thick metal sheets (at least for micro abrasive jet standards) at different levels of of and also in drilling with different strategies.

A complex shape is chosen for a complete characterization of the new system performance. This is the letter "A" in a particular font, used as a reference piece, as it contains:
- straight lines, where to measure roughness and streaks due to irregularities in the formation of the jet;
- acute angles, both inner and outer, to show the precision of the jet in defining the edges with a reduced jet lag effect;
- small radius curves, to show the limit of radius achievable according to the size of the jet;
- thin walls, to demonstrate the high stability and delicacy of the jet;
- long processing path, as a strength test for the stability and robustness of the system.

The smallest A which can be obtained with the focusing nozzle $d_f=0.20$ mm and the abrasive #230 mesh, minimum jet size available on the micro AWJ market to date, is 12 mm high and has a minimum radius of 0.12 mm. For the present study, the drawing was resized to 75%, whereby reaching a final height of 9 mm and a minimum radius of 0.09 mm.

Table 2 summarizes the main processing parameters for the execution of this reference piece, cut with the disclosed cutting machine, replicating the complete execution of the cutting program three times.

TABLE 2

Configuration and process parameters for sample production on 2-mm thick austenitic stainless steel (AISI 301/EN 1.4310).

| Parameter/Operation | Value/Strategy |
| --- | --- |
| Primary nozzle diameter [mm] | 0.05 |
| Focusing nozzle diameter | 0.13 |
| Hydraulic pressure [MPa] | 350 |
| Abrasive [type and mesh] | Garnet #600 mesh |
| Abrasive flow rate [g/min] | 3 |
| Pressure in mixing chamber [bar] | 0.78-0.80 |
| Advancement rate [mm/min] | 6 |
| Drilling strategy | Circular |
| Drilling time [s] | 4 |
| Distance from piece being drilled [mm] | 1.2 |
| Distance from piece being cut [mm] | 0.2 |
| Cutting length [mm] | 90 |
| Cutting time [min] | 15 |

Figure 6:
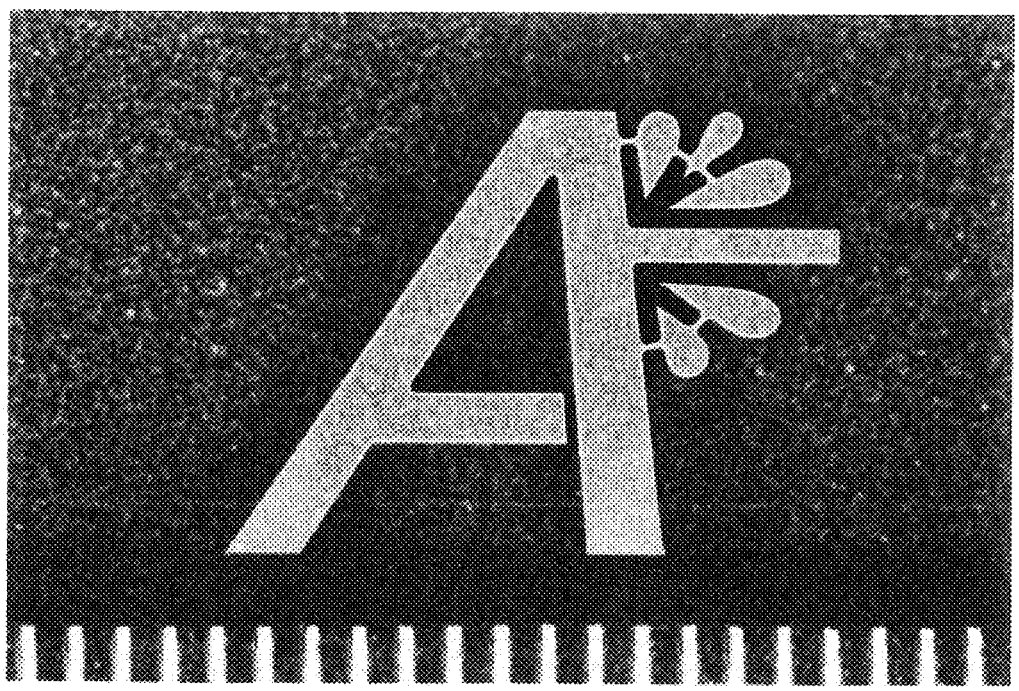
FIG. 6 shows a sample of material cut by means of the abrasive water jet cutting machine, according to an embodiment of the invention.

The sample is then detached from the base material to be observed and measured. FIG. 6 shows the resulting sample in a top-down view, where the precision and accuracy resulting from the cut can be observed. The sample is used to evaluate the cutting width in different cutting directions, showing no significant variation in all measurements.

Example 3: Comparison with the Background Art in the Execution of a Cut

The comparison between the abrasive water-jet cutting machine according to the invention and an abrasive water-jet cutting machine according to the background art in cutting a 2-mm thick austenitic stainless-steel sample (AISI 301/EN 1.4310) is shown here.

The technical specifications of the abrasive water-jet cutting machine according to the invention and of the abrasive water jet cutting machine according to the background art are listed in Table 3.1, while the results obtained following the test are shown in Table 3.2.

Figure 7:
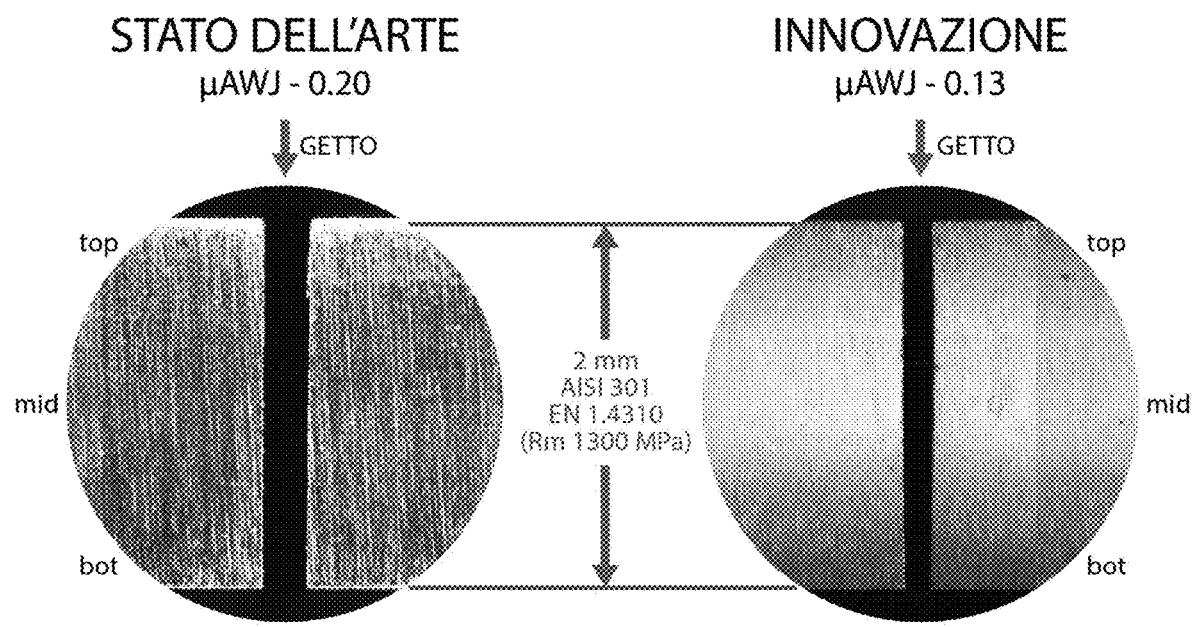
FIG. 7 shows two samples of the same material, cut with an abrasive water jet cutting machine according to the prior art and according to the invention.

As shown in Tables 3.1 and 3.2, and as shown in FIG. 7, the abrasive water-jet cutting machine according to the invention displays improvements compared to the prior art, in terms of the kerf quality, with cutting width reduced by 35%, and quality of roughness, with Ra and Rz reduced by 57%.

Furthermore, the abrasive water jet cutting machine, according to the invention, achieved such results respecting the tolerance of 1 hundredth of a millimeter on the taper of the wall.

TABLE 3.1

| Technical specifications | | |
| --- | --- | --- |
| | Background art | Cutting machine according to the invention |
| Primary nozzle diameter [mm] | 0.08 | 0.05 |
| Focusing nozzle diameter [mm] | 0.20 | 0.13 |
| Hydraulic pressure [MPa] | 350 | 350 |
| Abrasive | Garnet | Garnet |
| Abrasive mesh [# mesh] | #230 mesh | #600 mesh |
| Distance from piece [mm] | 0.35 | 0.20 |

TABLE 3.2

| Test results | | |
| --- | --- | --- |
| | Background art | Cutting machine according to the invention |
| Kerf width [mm] | 0.245 | 0.159 |
| Wall taper [mm] | −0.001 | 0.007 |
| Roughness Ra [µm] | top 1.10; mid 1.25; bot 1.38 | top 0.37; mid 0.51; bot 0.65 |
| Roughness Rz [µm] | top 8.77; mid 8.80; bot 9.87 | top 3.17; mid 3.83; bot 4.62 |

Of course, a person skilled in the art can make further changes and variants all contained within the scope of protection defined by the claims in order to satisfy contingent, specific needs.

The invention claimed is:
1. An abrasive water-jet cutting machine, comprising:
   pumping means, fluidically connectable to a water source, for the generation of a pressurized water flow;
   a cutting head, comprising a primary nozzle, a mixing chamber and a focusing nozzle, wherein the pressurized water flow originating from the pumping means is conveyed into the primary nozzle of the cutting head where the pressure energy of the pressurized water flow is converted into kinetic energy so as to form a water jet, and wherein said water jet is then conveyed into the mixing chamber;
   a dispensing system of powdered abrasive material, comprising:
      a tank containing powdered abrasive material,
      a feeding pipe, fluidically connecting the tank to the mixing chamber of the cutting head,
      a dispenser, dispensing the powdered abrasive material contained within the tank into the mixing chamber by means of the feeding pipe;
   wherein the cutting head mixes, in the mixing chamber, the abrasive material with the water jet forming a water-abrasive material mixture jet, and said cutting head dispenses the water-abrasive material mixture jet by means of the focusing nozzle;

wherein the powdered abrasive material contained in the tank is homogeneously dispersed in suspension in a gelatinous water-based fluid;

and wherein the mass ratio of the dispersed powdered abrasive material to the gelatinous water-based fluid is from 1.0 to 3.5.

2. The cutting machine according to claim 1, wherein the mass ratio of the powdered abrasive material to the gelatinous water-based fluid is of about 2.0.

3. The cutting machine according to claim 1, wherein the particle size of the powdered abrasive material homogeneously dispersed in suspension in the gelatinous water-based fluid is from #350 mesh to #600 mesh.

4. The cutting machine according to claim 1, wherein the mixing chamber is substantially tubular in shape, forming:
a front surface, a rear surface parallel to the front surface, and a peripheral surface,
a front seat at the front surface and a rear seat at the rear surface, wherein the front and rear seats (16, 17) are substantially cylindrical in shape,
a water inlet opening at the front seat, and a mixture outlet opening at the rear seat,
a jet channel, transverse to the front surface and to the rear surface, and in flow communication with the front seat and the rear seat by means of the water inlet opening and the mixture outlet opening.

5. The cutting machine according to claim 4, wherein the jet channel and the front seat form a front shoulder at the water inlet opening, and the jet channel and the rear seat form a rear shoulder at the mixture outlet opening, and wherein a primary nozzle housing is received inside the front seat, abutting against the front shoulder,
wherein the primary nozzle housing is substantially cylindrical in shape, and defines a front base and a rear base, wherein the rear base abuts against the front shoulder,
wherein the primary nozzle housing forms a primary nozzle seat at the front base,
wherein a primary nozzle is received in the primary nozzle seat, and wherein the primary nozzle transforms the pressurized water flow originating from the pumping means into the water jet.

6. The cutting machine according to claim 1, wherein the feeding pipe is connected, at a first end thereof, to the tank, and is connected, at a second end thereof, to an injector member,
and wherein the injector member comprises an injector housing and an injector nozzle,
and the injector housing forms a connection portion adapted to connect the feeding pipe to the injector member.

7. The cutting machine according to claim 6, wherein the injector housing forms a shaped channel therein, adapted to receive the injector nozzle, and wherein the injector nozzle forms an injection channel therein, and an end portion of the injector nozzle is configured to protrude into the jet channel of the mixing chamber, so that the injection channel fluidically connects the feeding pipe to the jet channel.

8. The cutting machine according to claim 7, wherein the shaped channel comprises an end portion forming an air injection channel which is concentric with respect to the end portion, and a coupling portion adapted to achieve a shape coupling with the injector nozzle, and wherein the air injection channel forms a gap between the air injection channel and the end portion of the injector nozzle.

9. The cutting machine according to claim 8, wherein the injector housing forms an air flow channel flowing into the air injection channel and forming a connection seat, and wherein the air flow channel is connected to a pneumatic conduit at the connection seat, and wherein a valve for the adjustment of the air flow entering the air flow channel is arranged on the pneumatic conduit, and the air flow entering the air flow channel is aspirated by the flow of the water jet due to the Venturi effect.

10. The cutting machine according to claim 1, wherein the dispensing system is provided with relief valves to evacuate air or other gas bubbles present in the gelatinous water-based fluid inside which the abrasive material is dispersed.

* * * * *